Patented Mar. 21, 1939

2,151,114

UNITED STATES PATENT OFFICE 2,151,114

SULPHURIZED INDOPHENOL DYESTUFFS AND PROCESS OF PRODUCING THE SAME

Alfred J. Johnson, Woodstown, N. J., assignor to E. I. du Pont de Nemours & Company, Wilmington, Del., a corporation of Delaware No Drawing. Application October 27, 1936, Serial No. 107,825

6 Claims. (Cl. 260—133)

This invention relates to green sulphur colors from 1-para-alkoxy-phenyl-amino-4-para-hydroxy-phenylamino-naphthalene-6-, -7- and -8- sulphonic acids, especially to new sulphur colors which are free from heavy metal salts and to methods of producing such new colors.

Heretofore, it was necessary in the production of sulphur colors of yellow shades of green to use copper compounds and to have copper in the finished dyestuff. A sulphur color which contains copper has been made by melting together the leuco indophenol from para-aminophenols and ethers of para-alkoxy-aryl-1-naphthylamino-6, -7 or -8 sulphonic acids in a substantially anhydrous melt containing sodium sulphide, sulphur, a copper salt and a dehydrating agent, for example in the presence of an excess of alcohol. The copper containing dyestuff is a satisfactory dye for many purposes but its color is deleteriously affected on the fibre by compounds which combine with copper, such as the sulphur compounds in rubber. Consequently the uses of the dyes are limited and it is desirable to provide sulphur dyestuffs in yellow shades of green which are more stable toward chemical compounds commonly encountered in the use of the dyed fabrics.

This invention has an object to provide methods of preparing new green sulphur colors. A further object is to provide sulphur green colors which do not contain heavy metals, such as copper. Another object is to provide sulphur green colors that are yellower than the copper-free types heretofore known, and possess other desirable properties, such as good solubility, fastness to washing, light, and a lack of susceptibility to discoloration on the fiber.

These objects are accomplished generally by preparing the leuco-indophenols from p-aminophenols and p-alkoxy-phenyl peri acids, or the corresponding derivatives of Cleve's acids, and thionating in the absence of copper or other heavy metal compounds. The dyes are soluble in water giving green solutions. They dye cotton a yellowish green which is similar to the yellowish green dyeings with copper-containing dyes.

The invention is illustrated but not limited by the following examples:

Example I 34.3 parts of p-ethoxy phenyl peri acid (1-paraethoxy-phenyl-amino-naphthylene-8-sulphonic acid) are dissolved in 200 parts of water and 10 parts of 30% caustic soda solution. The solution is cooled to 5° C. or lower by the addition of ice and 11.1 parts of p-aminophenol and 10 parts of 30% caustic soda solution are added. 500 parts of ice are next added, followed by 121 parts of sodium hypochlorite solution containing 13.2% available chlorine, forming the indophenol, represented by the following formula

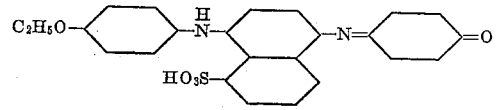

38 parts of sodium sulphide crystals are then added and when reduction to the leuco-indophenol is complete, 250 parts of salt and 67 parts of 22% hydrochloric acid are added to precipitate the leuco indophenol. The precipitated leuco-indophenol represented by the formula

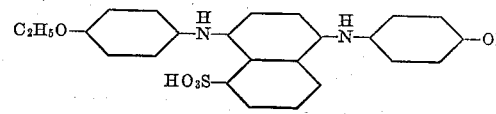

is filtered off and added to an alkali polysulphide solution consisting of 90 parts sodium sulphide crystals, 66 parts sulphur and 95 parts of the ethyl ether of ethylene glycol. The solution is heated to boiling under reflux for 14 hours and the color is isolated by dilution and precipitation by means of air or by the addition of salt. The exact formula of the new product is not known. It is a greenish black powder which dyes cellulosic material, such as cotton from an alkaline sulphide vat in bright yellow shades of green which are yellower than the shades produced from the same constituents which are made by processes heretofore known to the art. The dyestuff is soluble in water giving a green solution.

Example II

By substituting in Example I p-ethoxy phenyl-1:7-Cleve's acid (1-p-ethoxy-phenyl-amino-naphthylene-7-sulphonic acid) for p-ethoxy phenyl-peri acid and proceeding in a similar manner another sulphur color of a green shade is obtained. The product is a greenish black powder which dyes cellulosic material, such as cotton from a sulphide vat in bright yellow shades of green which are yellower than the green shades produced from leuco indophenols without the para-ethoxy group. The dye is soluble in water giving a green color.

Similarly corresponding derivatives of 1:6-Cleve's acid or mixtures of 1:6- and 1:7-Cleve's acids can be used, and the products and dyeings on cotton are distinguished in a similar manner.

Although preferred conditions are given in the examples, the operative limits of this invention are not necessarily limited thereto as the composition of the polysulphide, temperature and time of thionation and methods of isolation of the color can be varied within wide limits without affecting the nature of the product obtained. In place of p-ethoxy-phenyl derivatives of 1-6-, 1-7- or 1-8-amino naphthalene sulphonic acids, other p-alkoxy derivatives can be used, for instance the p-methoxy or p-butoxy compound. Mono- or dihalogen-p-aminophenols, such as dichlor-p-aminophenols may be used instead of p-aminophenol. The indophenols can be used instead of the leuco indophenols but leucoindophenols are preferred since it is found that they are less susceptible to decomposition.

The colors prepared by this method are bright yellowish shades of green, yellower than any copper-free sulphur greens prepared heretofore and possess excellent properties in regard to fastness to washing and light. Being copper-free, or at best being free from all except adventitious amounts or traces of copper which do not affect the colors, these colors are suitable for use where copper containing colors are detrimentally affected, such as in dyeing cloth to be rubberized.

As other embodiments of the invention will be suggested to those skilled in the art without departing from the spirit and scope of the invention, it is to be understood that no limitations are intended in the annexed claims except such as are specifically recited or are imposed by the prior art.

I claim:

1. The sulphur dyestuff identical with that which is obtainable by thionating the leuco indophenol from a p-aminophenol and a 1-para-alkoxy-phenyl-amino-naphthalene sulphonic acid in which the sulphonic acid group is in one of the positions -6, -7 and -8 and in which alkoxy contains 1 to 4 carbons, said thionation being effected by heating the leuco indophenol in a solution made by mixing the crystals of an alkali metal sulphide, a lower alkyl ether of ethylene glycol and sulphur, but which solution is free from compounds of heavy metals, said dyestuff giving yellowish green dyeings on cotton.

2. The sulphur dyestuff identical with that which is obtainable by thionating the leuco indophenol from a p-aminophenol and a 1-para-alkoxy-phenyl-amino-naphthalene-8-sulphonic acid and in which alkoxy contains 1 to 4 carbons, said thionation being effected by heating the leuco indophenol with refluxing in a solution made by mixing the crystals of an alkali metal sulphide, a lower alkyl ether of ethylene glycol and sulphur, but which solution is free from compounds of heavy metals, said dyestuff giving yellowish green dyeings on cotton.

3. The sulphur dyestuff identical with that which is obtainable by thionating the leuco indophenol from a p-aminophenol and a 1-para-alkoxy-phenyl-amino-naphthalene sulphonic acid in which the sulphonic acid group is in one of the positions -6, -7 and -8 and in which alkoxy contains 1 to 4 carbons, said thionation being effected by heating the leuco indophenol with boiling and refluxing in a solution made by mixing the crystals of an alkali metal sulphide, a lower alkyl ether of ethylene glycol and sulphur, but which solution is free from compounds of heavy metals, said dyestuff giving yellowish green dyeings on cotton.

4. The sulphur dyestuff identical with that which is obtainable by thionating the leuco indophenol from a p-aminophenol and a 1-para-alkoxy-phenyl-amino-naphthalene sulphonic acid in which the sulphonic acid group is in one of the positions -6, -7 and -8 and in which alkoxy contains 1 to 4 carbons, said thionation being effected by heating the leuco indophenol in a solution made by mixing 90 parts of sodium sulphide crystals, 66 parts sulphur and 95 parts of the ethyl ether of ethylene glycol, but which solution is free from compounds of heavy metals, said dyestuff giving yellowish green dyeings on cotton.

5. The process of making a sulphur dyestuff which comprises forming the leuco indophenol from a p-aminophenol and 1-para-alkoxy-phenyl-amino-naphthalene-sulphonic acid in which the sulphonic acid is in one of the positions -6, -7 and -8 and in which alkoxy contains 1 to 4 carbons, heating with boiling and refluxing in a thionating solution containing an alkali metal sulphide, sulphur, water at least equivalent to that contained in the crystals of sodium sulphide and a lower alkyl ether of ethylene glycol until the indophenol is thionated, and precipitating the thionated product.

6. The process of making a sulphur dyestuff which comprises forming the leuco indophenol from a p-aminophenol and 1-para-alkoxy-phenyl-amino-naphthalene-8-sulphonic acid in which alkoxy contains 1 to 4 carbons, heating with boiling and refluxing in a thionating solution containing an alkali metal sulphide, sulphur, water at least equivalent to that contained in the crystals of sodium sulphide and a lower alkyl ether of ethylene glycol until the indophenol is thionated, and precipitating the thionated product.

ALFRED J. JOHNSON.